(12) United States Patent
Tanaka et al.

(10) Patent No.: US 10,146,227 B2
(45) Date of Patent: Dec. 4, 2018

(54) DRIVING ASSISTANCE APPARATUS

(71) Applicant: FUJITSU TEN LIMITED, Kobe-shi, Hyogo (JP)

(72) Inventors: Shinichi Tanaka, Kobe (JP); Kohichi Tomiyama, Kobe (JP); Fumiaki Bando, Kobe (JP); Yusuke Iguchi, Kobe (JP); Shuhei Shibata, Kobe (JP); Hironori Ichioka, Kobe (JP); Kenta Nose, Kobe (JP)

(73) Assignee: FUJITSU TEN Limited, Kobe-shi (JP)

( * ) Notice: Subject to any disclaimer, the term of this patent is extended or adjusted under 35 U.S.C. 154(b) by 11 days.

(21) Appl. No.: 15/290,636

(22) Filed: Oct. 11, 2016

(65) Prior Publication Data

US 2017/0108873 A1    Apr. 20, 2017

(30) Foreign Application Priority Data

Oct. 15, 2015    (JP) ................. 2015-203639

(51) Int. Cl.
*G05B 1/02*        (2006.01)
*G05D 1/02*        (2006.01)
(Continued)

(52) U.S. Cl.
CPC ..... *G05D 1/0238* (2013.01); *B60W 30/18009* (2013.01); *B60W 50/14* (2013.01); *B62D 15/0285* (2013.01); *E05F 15/77* (2015.01)

(58) Field of Classification Search
CPC .................................................. G05D 1/0238
See application file for complete search history.

(56) References Cited

U.S. PATENT DOCUMENTS 6,707,391 B1 *    3/2004    Monroe ............... G08G 1/0965
                                                340/901
8,208,888 B2 *    6/2012    Chutorash .......... G07C 9/00309
                                                455/352

(Continued)

FOREIGN PATENT DOCUMENTS

JP    H08-218669 A    8/1996
JP    2002-271869 A    9/2002
(Continued)

*Primary Examiner* — Adam D Tissot
*Assistant Examiner* — Michael A Berns
(74) *Attorney, Agent, or Firm* — Oliff PLC

(57) ABSTRACT

An in-vehicle driving assistance apparatus includes an automatic garage leaving control unit that performs automatic garage leaving cooperation control in which the automatic garage leaving control unit cooperates with a shutter control apparatus to cause a vehicle to automatically leave the garage. The automatic garage leaving control unit acquires vehicle surrounding information on presence or absence of abnormality around the vehicle when the automatic garage leaving control unit accepts an automatic garage leaving request signal, transmits an open request signal requesting to open a shutter to the shutter control apparatus when the automatic garage leaving control unit determines based on the vehicle surrounding information that a space around the vehicle is safe, and suspends the automatic garage leaving cooperation control when the automatic garage leaving control unit determines that abnormality is present around the vehicle.

8 Claims, 11 Drawing Sheets

(51) Int. Cl.
*B60W 30/18* (2012.01)
*B60W 50/14* (2012.01)
*B62D 15/02* (2006.01)
*E05F 15/77* (2015.01)

(56) References Cited

U.S. PATENT DOCUMENTS

| | | | |
|---|---|---|---|
| 8,970,352 B2 * | 3/2015 | Holt | G07C 9/00309 |
| | | | 340/12.24 |
| 9,208,629 B2 * | 12/2015 | Saladin | G07C 9/00896 |
| 9,581,997 B1 * | 2/2017 | Penilla | G05D 1/0011 |
| 9,656,691 B2 * | 5/2017 | Heimberger | B62D 15/0285 |
| 2017/0316630 A1 * | 11/2017 | Zeinstra | G07C 9/00182 |
| 2017/0334380 A1 * | 11/2017 | Bonnet | B60R 16/037 |

FOREIGN PATENT DOCUMENTS

| | | |
|---|---|---|
| JP | 2007-230319 A | 9/2007 |
| JP | 2007-233771 A | 9/2007 |
| JP | 2008-051774 A | 3/2008 |
| JP | 2008-285878 A | 11/2008 |
| JP | 2010-067238 A | 3/2010 |
| JP | 2013-011129 A | 1/2013 |
| JP | 2014-141175 A | 8/2014 |

\* cited by examiner

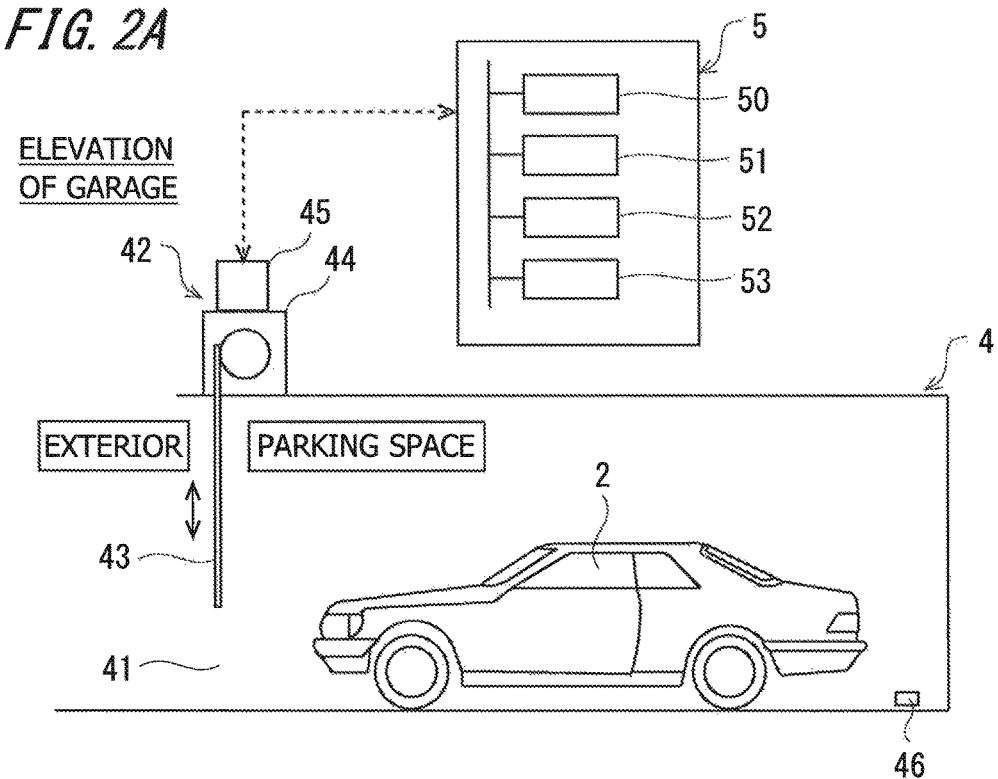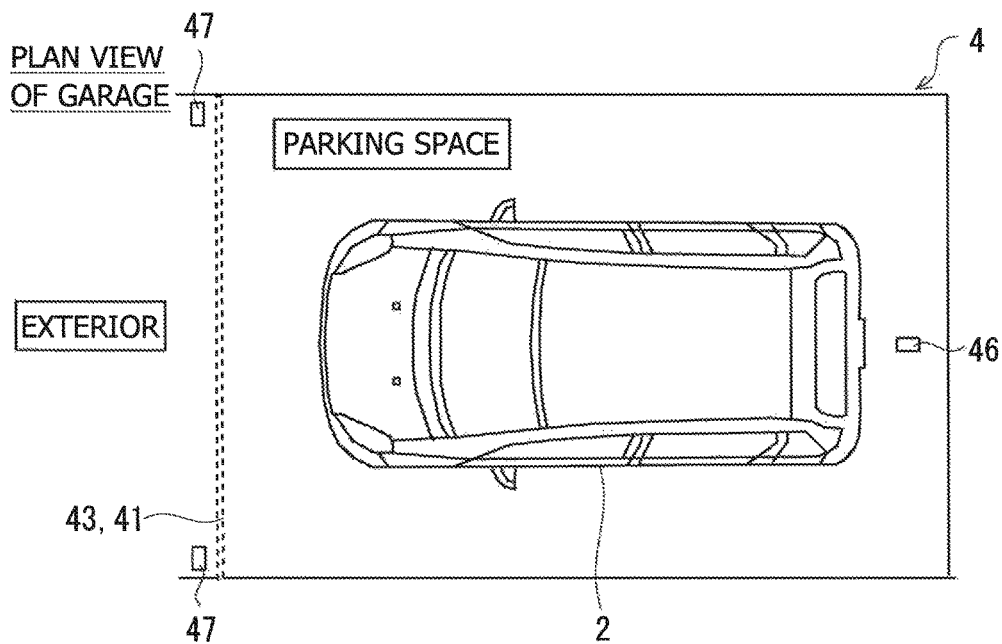

GARAGE LEAVING LINE Lw

DRIVING ASSISTANCE APPARATUS

CROSS-REFERENCE TO RELATED APPLICATIONS

This application is based upon and claims the benefit of prior Japanese Patent Application No. 2015-203639 filed on Oct. 15, 2015, the entire contents of which are incorporated herein by reference.

FIELD

The present invention relates to a driving assistance apparatus, a vehicle, and a garage cooperation control system.

BACKGROUND

There is a known driving assistance apparatus that allows a vehicle to automatically leave a garage. A vehicle including the driving assistance apparatus is capable of automatically leaving a garage without a driver in the vehicle. There is also a known system that automatically opens and closes a shutter of a garage (see Patent document 1, for example). In a known shutter automatic open/close system of this type, the shutter is opened and closed by operation of a remote control, such as an infrared remote control. In recent years, there has been a proposed system in which a shutter is automatically opened when an accessory (ACC) power source of a vehicle is turned on and the shutter is automatically closed after the vehicle moves away from the garage by a fixed distance.

[Patent document 1] Japanese Patent Laid-Open No. 2002-271869
[Patent document 2] Japanese Patent Laid-Open No. 2008-285878
[Patent document 3] Japanese Patent Laid-Open No. 2007-230319
[Patent document 4] Japanese Patent Laid-Open No. 2007-233771
[Patent document 5] Japanese Patent Laid-Open No. 8-218669
[Patent document 6] Japanese Patent Laid-Open No. 2010-67238
[Patent document 7] Japanese Patent Laid-Open No. 2008-51774

SUMMARY

Technical Problem

To cause a vehicle including a driving assistance apparatus having a self-propelled garage leave function to automatically leave a garage with no human intervention or with no driver in the vehicle, however, there is a concern that the vehicle automatically leaves the garage without positive confirmation of safety around the vehicle in the garage although the check would have been made by a driver.

The present invention has been made in view of the circumstances described above, and an object of the present invention is to provide a technology of a driving assistance apparatus capable of checking safety in a garage even in a case where a vehicle with no driver in it is caused to automatically leave the garage with no human intervention.

Solution to Problem

The present invention adopts the following aspects to achieve the object described above. That is, an driving assistance apparatus according to the present invention is an in-vehicle driving assistance apparatus that causes a vehicle to automatically leave a garage including a shutter control apparatus that opens and closes a shutter of the garage, the driving assistance apparatus including an automatic garage leaving control unit that performs automatic garage leaving cooperation control in which the automatic garage leaving control unit cooperates with the shutter control apparatus to cause the vehicle to automatically leave the garage. The automatic garage leaving control unit acquires vehicle surrounding information on presence or absence of abnormality around the vehicle when the automatic garage leaving control unit accepts an automatic garage leaving request signal, transmits an open request signal requesting to open the shutter to the shutter control apparatus when the automatic garage leaving control unit determines based on the vehicle surrounding information that a space around the vehicle is safe, and suspends the automatic garage leaving cooperation control when the automatic garage leaving control unit determines that abnormality is present around the vehicle.

The automatic garage leaving control unit may be configured to notify a mobile terminal of a user of abnormality detection information when the automatic garage leaving control unit determines that abnormality is present around the vehicle.

The automatic garage leaving control unit may be configured to transmit a close request signal requesting to close the shutter to the shutter control apparatus when the automatic garage leaving control unit senses that the automatically traveling vehicle has gone out of the garage.

The automatic garage leaving control unit may be configured to suspend the automatic garage leaving cooperation control when the automatic garage leaving control unit senses that a moving body has entered the garage from outside after the automatic garage leaving control unit transmits the open request signal to the shutter control apparatus.

The automatic garage leaving control unit may be configured to notify a mobile terminal of a user of moving body entry information when the automatic garage leaving control unit senses that a moving body has entered the garage from outside after the automatic garage leaving control unit transmits the open request signal to the shutter control apparatus.

The automatic garage leaving control unit may be configured to suspend the automatic garage leaving cooperation control when the automatic garage leaving control unit senses that the shutter has been abnormally shut down after the automatic garage leaving control unit transmits the open request signal to the shutter control apparatus.

The automatic garage leaving control unit may be configured to notify a mobile terminal of a user of shutter abnormal shut down information when the automatic garage leaving control unit senses that the shutter has been abnormally shut down after the automatic garage leaving control unit transmits the open request signal to the shutter control apparatus.

The automatic garage leaving control unit may be configured to cause the vehicle to start traveling when the automatic garage leaving control unit senses that an opening height of the shutter becomes greater than a height of the vehicle after the automatic garage leaving control unit transmits the open request signal to the shutter control apparatus.

The automatic garage leaving control unit may be configured to notify a driver of status information during the automatic garage leaving control when the automatic garage leaving control unit receives the automatic garage leaving request signal and senses that the driver is in the vehicle.

The present invention can be further identified as a vehicle that incorporates any of the driving assistance apparatus described above.

The present invention can be further identified as a garage cooperation control system. That is, a garage cooperation control system according to the present invention is a garage cooperation control system including a shutter control apparatus that opens and closes a shutter of a garage, an in-vehicle driving assistance apparatus that causes a vehicle to automatically leave the garage, and a detection unit for detecting presence or absence of abnormality around the vehicle. The driving assistance apparatus includes an automatic garage leaving control unit that performs automatic garage leaving cooperation control in which the driving assistance apparatus cooperates with the shutter control apparatus to cause the vehicle to automatically leave the garage. The automatic garage leaving control unit acquires vehicle surrounding information on presence or absence of abnormality around the vehicle from the detection unit when the automatic garage leaving control unit accepts a garage leaving request signal. When the automatic garage leaving control unit determines that a space around the vehicle is safe based on the vehicle surrounding information, the automatic garage leaving control unit transmits an open request signal requesting to open the shutter is opened to the shutter control apparatus, whereas when the automatic garage leaving control unit determines that abnormality is present around the vehicle, the automatic garage leaving control unit suspends the automatic garage leaving cooperation control.

Possible combinations of the aspects that achieve the object of the present invention can also be adopted.

Advantageous Effect of Invention

The present invention can provide a technology of a driving assistance apparatus capable of checking safety in a garage even in a case where a vehicle with no driver in it is caused to automatically leave the garage with no human intervention.

BRIEF DESCRIPTION OF DRAWINGS

FIG. 2A is a schematic view of a garage according to the first embodiment.

FIG. 2B is a schematic view of a garage according to the first embodiment.

DESCRIPTION OF EMBODIMENTS

Embodiments of the present invention will be described below in detail with reference to the drawings. The dimensions, materials, shapes, relative arrangement, and other factors of components described in the embodiments are not intended to limit the technical scope of the present invention to them unless otherwise particularly specified in the description.

First Embodiment

<<System Configuration>>

Figure 1:
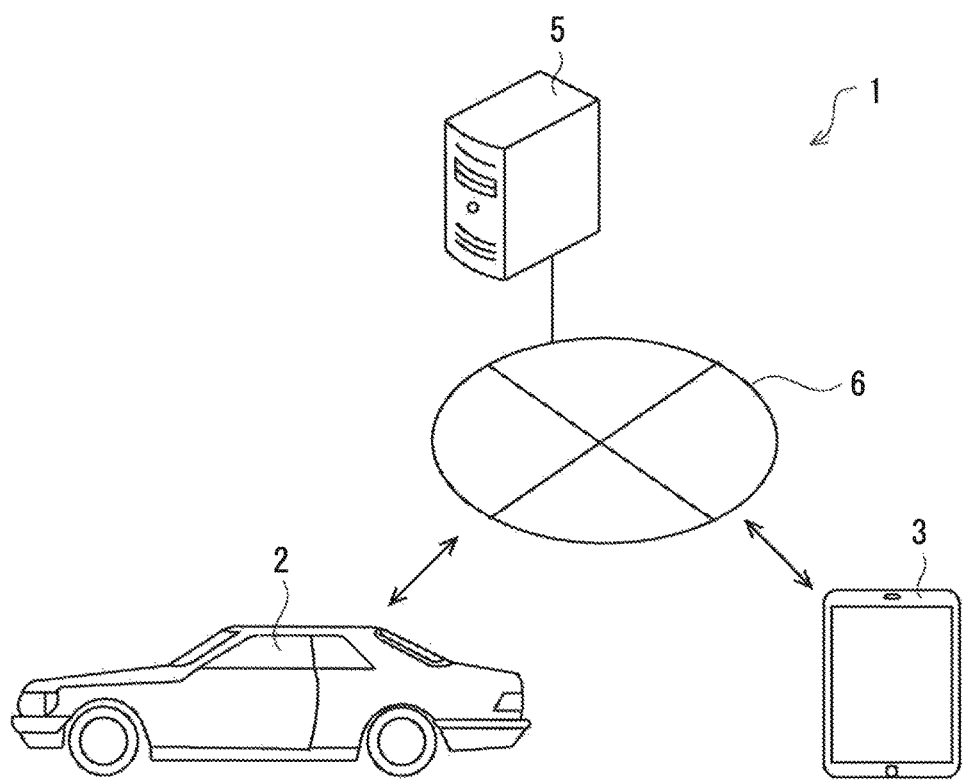
FIG. 1 is a schematic view of a garage cooperation control system according to a first embodiment.

FIG. 1 is a schematic view of a garage cooperation control system 1 according to a first embodiment. The garage cooperation control system 1 includes a vehicle 2, a mobile terminal 3, and a shutter control unit 5 attached to a garage 4 (see FIGS. 2A and 2B). The garage cooperation control system 1 is a system that causes the vehicle 2 to automatically leave the garage 4. The vehicle 2, the mobile terminal 3, and the shutter control unit 5 are connected to each other over a network 6. The network 6 may, for example, comply with Wi-Fi (wireless fidelity, registered trademark), Bluetooth (registered trademark), or any other communication standard.

The shutter control unit 5 is a home server provided in association with the garage 4 illustrated in FIGS. 2A and 2B. FIG. 2A is an elevation of the garage 4, and FIG. 2B is a plan view of the garage 4. The garage 4 is provided with a shutter apparatus 42, which closes an entrance 41 on the side facing a road. The shutter apparatus 42 includes a shutter 43, which is an open/close body that goes up and down in the vertical direction to open and close the entrance 41, a shutter case 44, which accommodates the wound shutter 43, a shutter driver 45, and other components. The shutter case 44 is, for example, provided above the entrance 41, and the entrance 41 is closed when the shutter 43 is drawn out downward from the shutter case 44 and is opened when the shutter 43 is wound into the shutter case 44.

The shutter driver 45 includes an electric motor and other components. The shutter driver 45 drives the shutter 43 in such a way that the shutter 43 is wound and drawn out. That is, the entrance 41 is opened and closed when the shutter driver 45 drives the shutter 43.

A sensor 46 is installed in the garage 4, and the sensor 46 senses, in the horizontal direction, the presence of a person in a space close to the floor in the interior (parking space) of the garage 4. The sensor 46 may be an infrared sensor or an ultrasonic sensor. The sensor 46 is a sensor used to check safety in the space under the vehicle 2 having entered the garage 4. Even if an object, such as a child and an animal, is present in the space under the vehicle 2, the sensor 46 can detect the object.

A pair of distance measurement (distance) sensors 47 are installed in positions outside the entrance 41 of the garage 4 and on opposite sides of the entrance 41. The pair of distance measurement sensors 47 are provided in positions close to the entrance 41. The distance measurement sensors 47 are sensors that work as follows: A light source (LED or laser diode, for example) in each of the sensors emits light; when the light impinges on an object to be measured, the light is reflected off the object; a light receiving element in the sensor receives the reflected light; the received light is so evaluated and computed as to be converted into a distance; and the sensor outputs the distance.

The shutter control unit 5 includes a control unit 50, a storage unit 51, a communication unit 52, an input/output IF 53, and other components, which are connected to each other via a communication bus. The control unit 50 is a microcomputer formed of a CPU (central processing unit), a RAM (random access memory), a ROM (read only memory), and other components. The CPU executes a variety of programs to carry out a variety of processes according to the present embodiment. The RAM and the ROM are main storage devices that cache a program and data read by the CPU and provide a work area for the CPU. The storage unit 51 is specifically an HDD (hard-disk drive), an SSD (solid-state drive), an eMMC (embedded multi-media card), a flash memory, or any other component. The communication unit 52 is an interface that transmits and receives data to and from another computer, and the shutter control unit 5 is connected to the network 6 via the communication unit 52. The input/output IF 53 is connected to an input/output device, receives an input from a user, and outputs information to the user. The input/output device is specifically a keyboard, a mouse, a display, a touch panel, or any other component. The shutter control unit 5 is connected to the shutter driver 45, the sensor 46, and the distance measurement sensors 47 via electric wiring lines.

Figure 3:
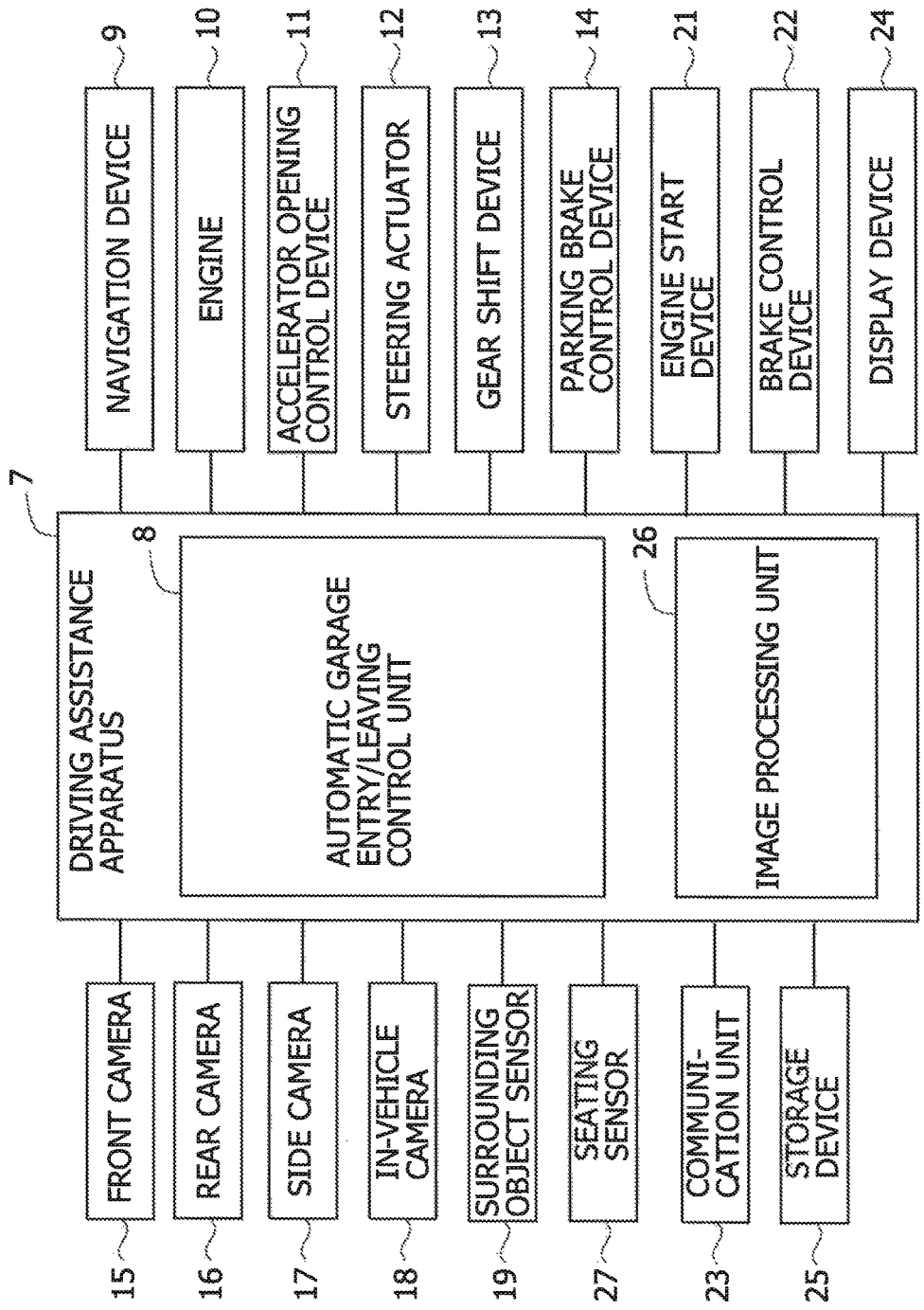
FIG. 3 is a block diagram illustrating the configuration of a vehicle according to the first embodiment.

FIG. 3 is a block diagram illustrating the configuration of the vehicle 2 according to the first embodiment. The vehicle 2 is provided with a driving assistance apparatus 7, which is connected to a CAN (controller area network) that is an in-vehicle communication network but is not illustrated. The driving assistance apparatus 7 is an apparatus that assists a driver in driving, and a function of automatically controlling the vehicle 2 in such a way that it enters and leaves the garage 4 is also a function of the driving assistance apparatus 7. The driving assistance apparatus 7 includes an automatic garage entry/leaving control unit 8 and an image processing unit 26. The automatic garage entry/leaving control unit 8 and the image processing unit 26 are, for example, an electric control unit ECU primarily formed of a microcomputer including a CPU, a RAM, a ROM, and other components.

The vehicle 2 includes a navigation device 9, an engine 10, an accelerator opening control device 11, which controls the accelerator opening, a steering actuator 12, which changes the amount of steering, a gear shift device 13, a parking brake control device 14, which controls an electric parking brake, and other components. The vehicle 2 further includes a front camera 15, a rear camera 16, a pair of right and left side cameras 17, an in-vehicle camera 18, surrounding object sensors 19, which detect the position of an obstacle around the vehicle 2, an engine start device 21, a brake control device 22, which controls a brake, a communication unit 23, a display device 24, a storage device 25, a seating sensor 27, which is provided in the driver's seat, and other components. The driving assistance apparatus 7 is electrically connected to the devices described above over the CAN. The storage device 25 is specifically an HDD (hard-disk drive), an SSD (solid-state drive), an eMMC (embedded multi-media card), a flash memory, or any other component.

Figure 4:
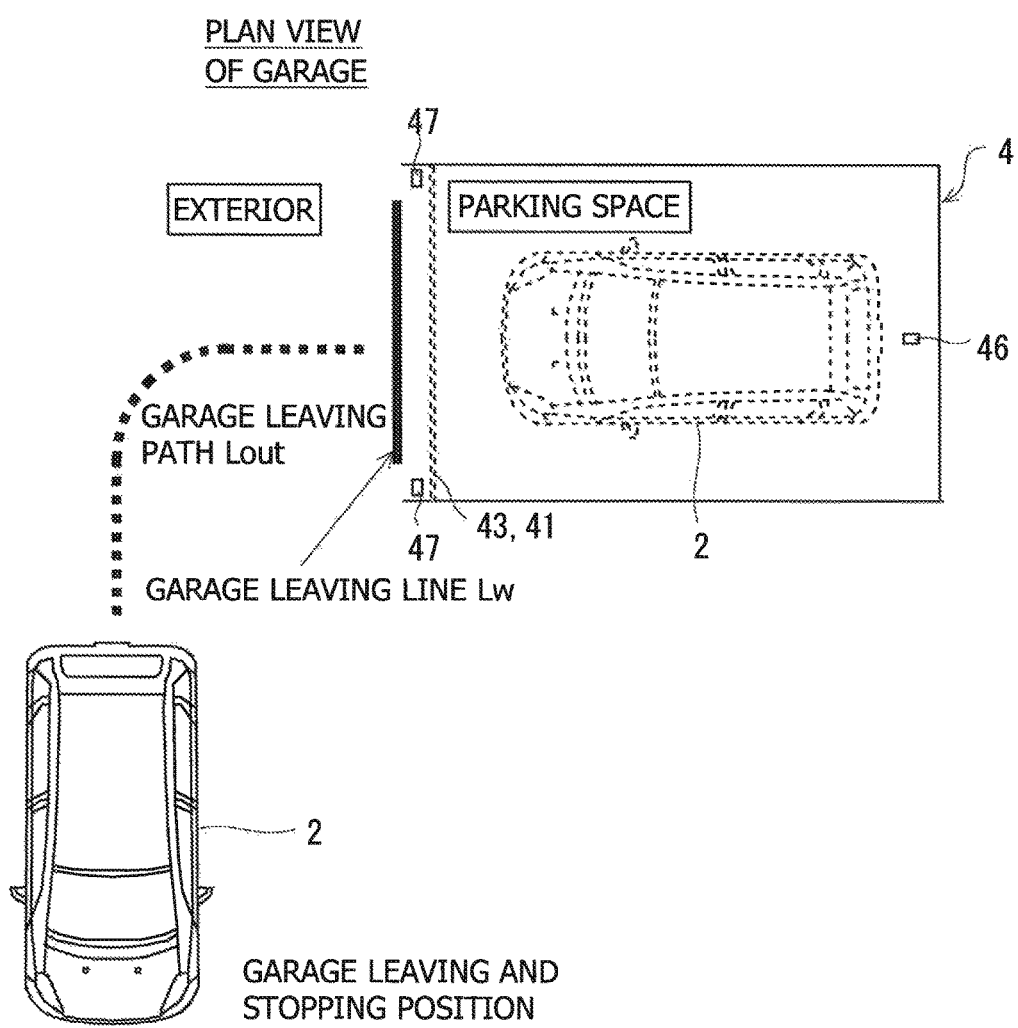
FIG. 4 illustrates a garage leaving path along which the vehicle is automatically caused to leave the garage in automatic garage leaving control according to the first embodiment.

The navigation device 9 detects the position of the vehicle on the basis of GPS signals from positioning satellites used in a GPS (global positioning system), guides the driver along a path to a destination on the basis of map data, and performs other types of operation. The driving assistance apparatus 7 further drives and controls the engine start device 21, the parking brake control device 14, the gear shift device 13, the steering actuator 12, the accelerator opening control device 11, and other components to achieve automatically steered traveling of the vehicle 2 and can hence perform automatic garage entry control in which the vehicle 2 is caused to enter the garage 4 with no human intervention and automatic garage leaving control in which the vehicle 2 is caused to leave the garage 4 with no human intervention. In the automatically steered traveling associated with the automatic garage entry control and the automatic garage leaving control, a path along which the vehicle 2 enters the garage and a path along which the vehicle 2 leaves the garage are determined in advance. For example, FIG. 4 illustrates a garage leaving path Lout along which the vehicle 2 is automatically caused to leave the garage 4 in the automatic garage leaving control. In the automatic garage leaving control, the vehicle 2 undergoes the automatically steered traveling, leaves the garage 4, and then automatically comes to a halt in a predetermined garage leaving and stopping position. The automatic garage entry control and the automatic garage leaving control are performed on the basis of the position of the vehicle detected based on the GPS signals and the map data used in the navigation device 9 in such a way that the vehicle 2 travels along the garage entry path and the garage leaving path.

Figure 5:
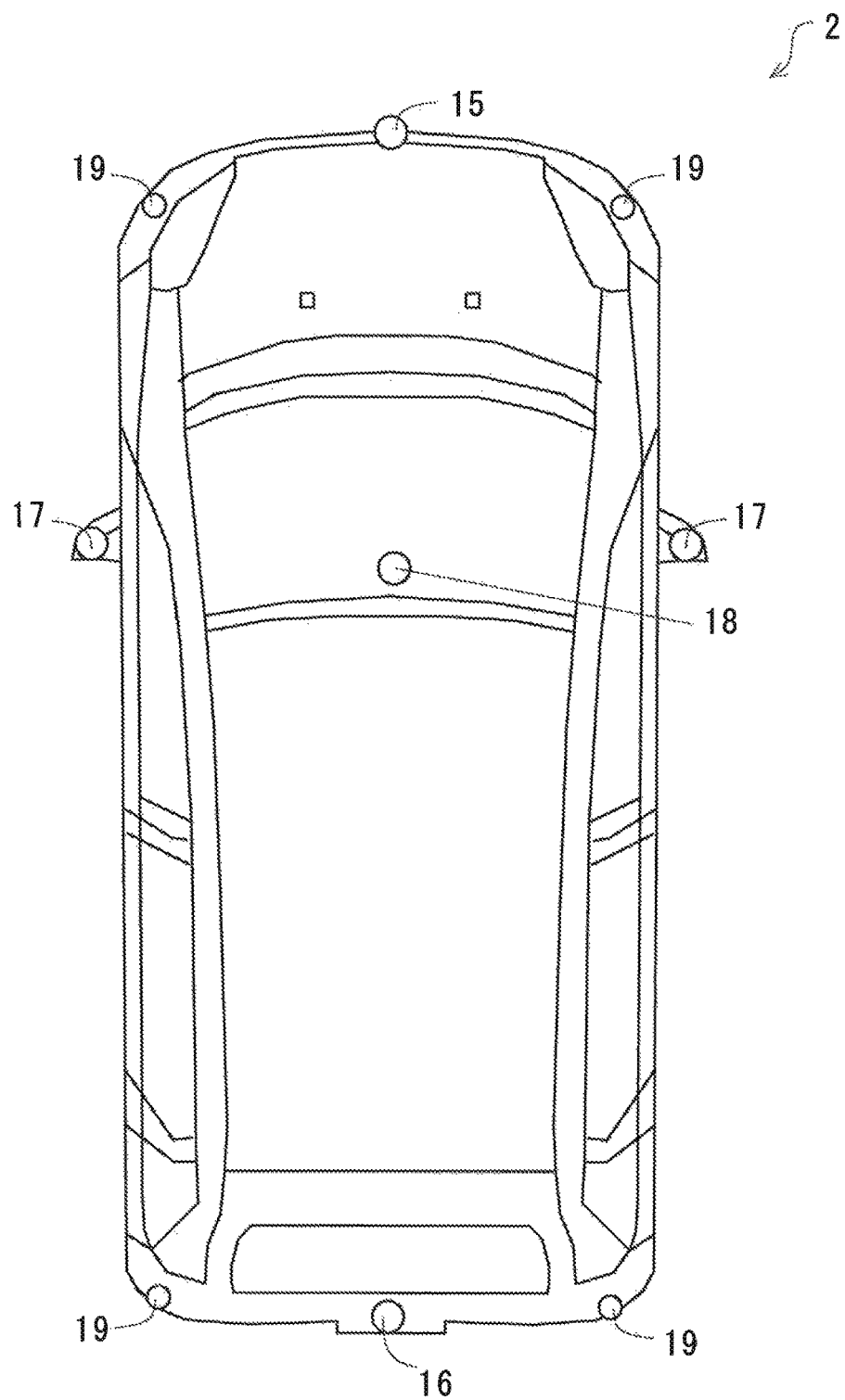
FIG. 5 illustrates the positions where a front camera, a rear camera, side cameras, an in-vehicle camera, and surrounding object sensors are installed in the vehicle according to the first embodiment.

FIG. 5 illustrates the positions where the front camera 15, the rear camera 16, the side cameras 17, the in-vehicle camera 18, and the surrounding object sensors 19 are installed in the vehicle 2 according to the first embodiment. The front camera 15 is provided in a front portion of the vehicle 2. For example, the front camera 15 may be provided in a position close to the position where the front number plate is attached to the vehicle 2. The rear camera 16 is provided in a rear portion of the vehicle 2. For example, the rear camera 16 may be provided in a position close to the position where the rear number plate is attached to the vehicle 2. The pair of side cameras 17 are provided on the right and left side surfaces of the vehicle 2. For example, the pair of side cameras 17 may be provided in the right and left door mirrors of the vehicle 2.

A fisheye lens having an angle of view greater than or equal to 180 degrees may, for example, be adopted as each of the front camera 15, the rear camera 16, and the pair of side cameras 17. In this case, the front camera 15, the rear camera 16, and the pair of side cameras 17 can be used to capture images along the entire circumference of the vehicle 2. The in-vehicle camera 18 is a camera that is installed in the vehicle and captures an image of the exterior of the vehicle compartment through the windshield. The in-vehicle camera 18 is attached, for example, in a position at a height close to the roof of the vehicle 2, for example, in a position close to a rear-view mirror (not illustrated). The surrounding object sensors 19 are provided at the four corners of the vehicle 2, as illustrated in FIG. 5. The number of surrounding object sensors 19 is, however, not limited to a specific number. For example, additional surrounding object sensors 19 may be installed in positions close to the front camera 15 and the rear camera 16 in addition to those installed at the four corners of the vehicle 2.

Figure 6:
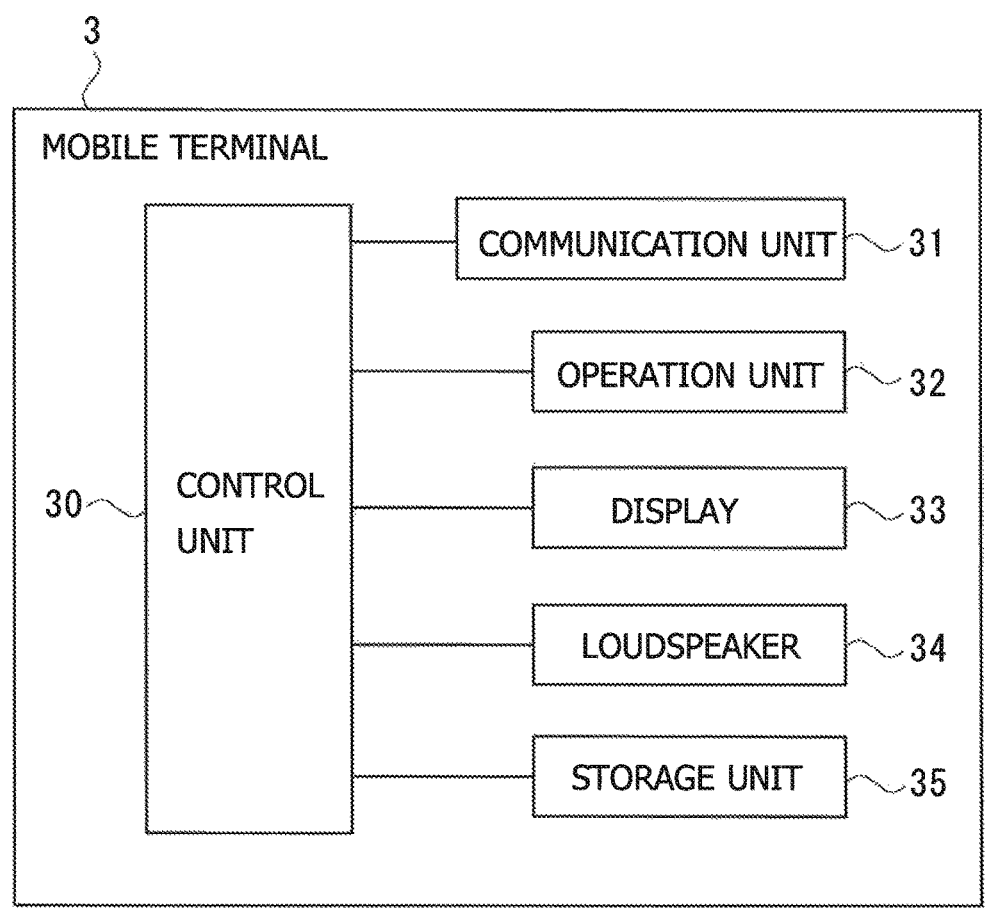
FIG. 6 is a block diagram illustrating the configuration of a mobile terminal according to the first embodiment.

The configuration of the mobile terminal 3 will next be described. FIG. 6 is a block diagram illustrating the configuration of the mobile terminal 3 according to the first embodiment. The mobile terminal 3 can, for example, be a mobile phone, a smartphone, a tablet, or any other information processing device (terminal device) connectable to the network 6. The mobile terminal 3 includes a control unit 30, a communication unit 31, an operation unit 32, a display 33, a loudspeaker 34, a storage unit 35, and other components.

The control unit 31 is formed of a computer including a CPU (central processing unit), a RAM (random access memory), a ROM (read only memory), and other components. The CPU carries out computation processes in accordance with a predetermined program stored in the ROM, allowing the control unit 30 to carry out a variety of processes.

The communication unit 31 is a communication interface that includes an antenna, a wireless circuit unit, a communication control unit, and other components and is used to communicate with the communication unit 23 in the vehicle 2 over the network 6. The operation unit 32 has operation keys that allow the user to input letters, numerals, and other pieces of information and a selection key that allows the user to select a predetermined menu. A touch panel may instead be used as the operation unit 32. The display 33 is, for example, an LCD (liquid crystal display), an EL display, or any other display and displays a variety of data, images, and other pieces of information. When a touch panel is used as the display 33, the touch panel may, for example, be integrated with a display area of the display 33. The storage unit 35 is formed of a flash memory, an SRAM (static random access memory), or any other memory and stores transmitted and received data, application programs, and other pieces of information.

<<Automatic Garage Leaving Control>>

The garage cooperation control system 1 according to the present embodiment not only allows a driver in the vehicle 2 to drive the vehicle 2 and leave the garage 4 but also the automatic garage leaving control, in which the vehicle 2 under unmanned automatic steering control leaves garage 4 with no driver in the vehicle 2. In the case where the vehicle 2 is caused to leave the garage 4 with no human intervention, the shutter 43 of the garage 4 is typically closed from a viewpoint of crime prevention. Before performing the automatic garage leaving control, it is therefore necessary to first check safety around the vehicle 2 having entered the parking space of the garage 4, open the shutter 43, and cause the vehicle 2 to leave the garage 4. In view of the necessity described above, the automatic garage entry/leaving control unit 8 of the vehicle 2 in the present embodiment is configured to perform automatic garage leaving cooperation control in which the vehicle 2 is caused to safely leave the garage 4 in cooperation (harmony, coordination) with the shutter control unit 5, which is part of the garage 4.

A description will be made of the procedure of processes carried out in the automatic garage leaving cooperation control in the garage cooperation control system 1. In the automatic garage leaving cooperation control, the driving assistance apparatus 7 (automatic garage entry/leaving control unit 8) in the vehicle 2 and the shutter control unit 5 of the garage 4 carry out the processes in cooperation with each other.

Figure 7:
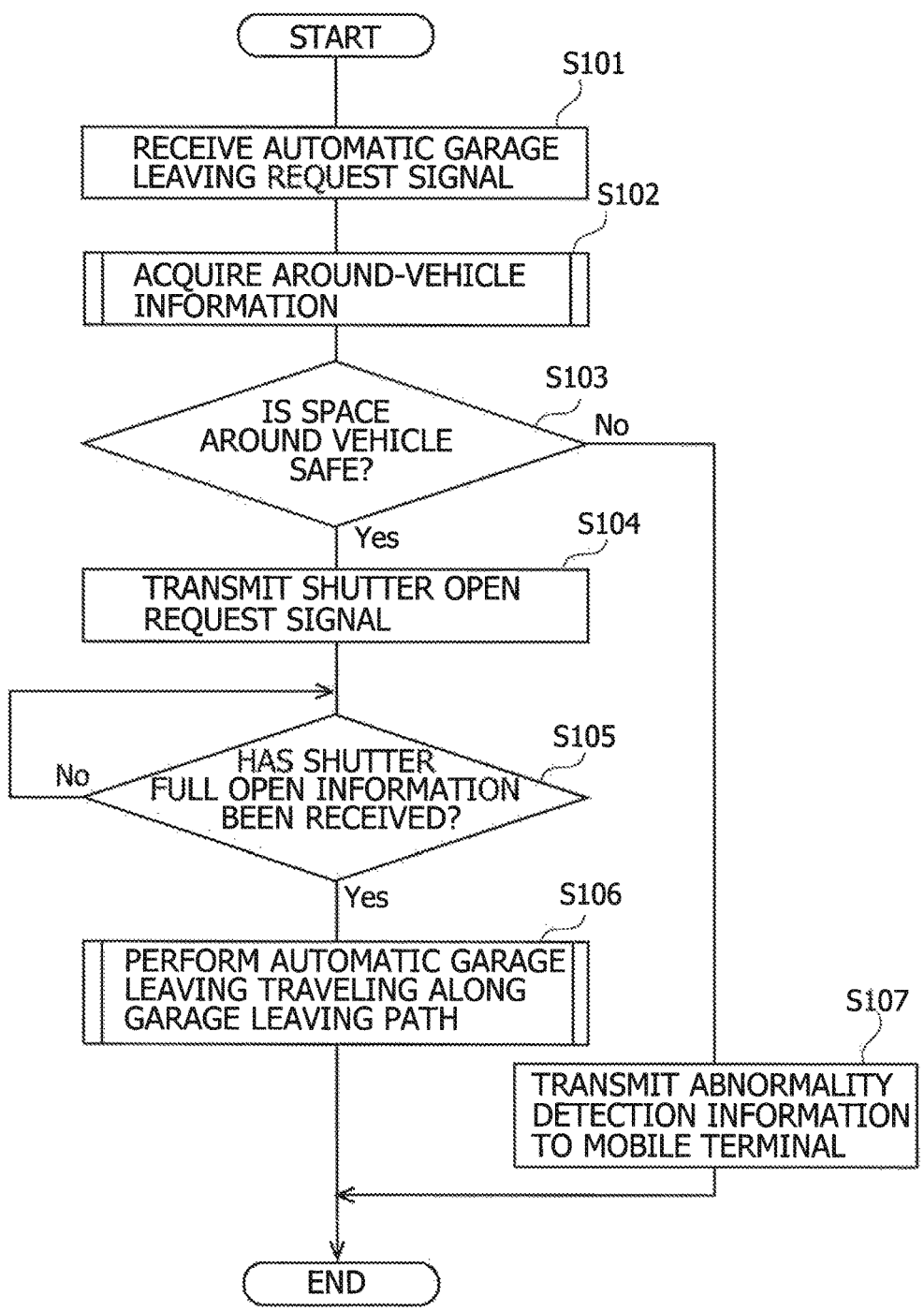
FIG. 7 is a flowchart illustrating processes in a main routine of automatic garage leaving cooperation control performed by a driving assistance apparatus.

FIG. 7 is a flowchart illustrating processes in a main routine of the automatic garage leaving cooperation control performed by the driving assistance apparatus 7 in the vehicle 2. The automatic garage leaving cooperation control is initiated in response to an event in which the communication unit 23 of the vehicle 2 receives an automatic garage leaving request signal (step S101). The automatic garage leaving request signal is transmitted from the communication unit 31 of the mobile terminal 3, for example, when an owner of the vehicle 2 operates the operation unit 32 of the mobile terminal 3. The automatic garage leaving request signal transmitted from the communication unit 31 of the mobile terminal 3 is received by the communication unit 23 of the vehicle 2 over the network 6. Instead, an automatic garage leaving button, which is provided as an electronic key of the vehicle 2, may be operated, and the electronic key may transmit the automatic garage leaving request signal toward the vehicle 2 in response to the operation of the automatic garage leaving button.

Having received the automatic garage leaving request signal, the automatic garage entry/leaving control unit 8 acquires vehicle surrounding information on presence or absence of abnormality around the vehicle 2 (step S102). The automatic garage entry/leaving control unit 8 checks safety around (in front of, behind, on the right of, and on the left of) the vehicle 2 and in the space under the vehicle (gap between the bottom of the vehicle 2 and the floor of the garage 4). In the safety check (presence or absence of abnormality) around (in front of, behind, on the right of, and on the left of) the vehicle 2, the front camera 15, the rear camera 16, and the pair of right and left side cameras 17, which are provided in the vehicle 2, are used to capture images of the surroundings of the vehicle 2 and the safety around the vehicle 2 is evaluated on the basis of data on the captured images. In the safety check (presence or absence of abnormality) in the space under the vehicle 2, the sensor 46 installed in the garage 4 is used to perform sensing and the safety check in the space under the vehicle is evaluated on the basis of a result of the sensing.

Figure 8:
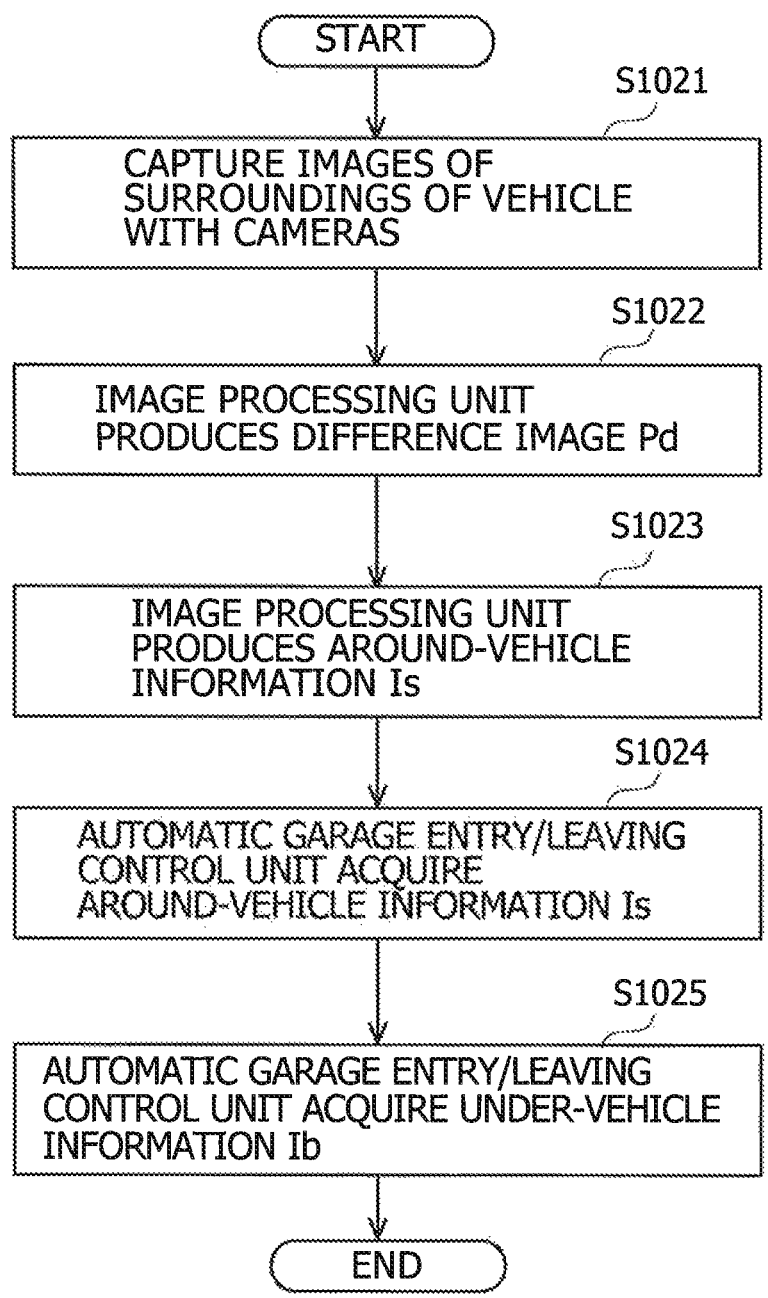
FIG. 8 is a flowchart illustrating processes in a subroutine executed in step S102 in FIG. 7.

FIG. 8 is a flowchart illustrating processes in a subroutine executed in step S102 in FIG. 7. In step S1021, the automatic garage entry/leaving control unit 8 of the vehicle 2 (driving assistance apparatus 7) uses the front camera 15, the rear camera 16, and the pair of right and left side cameras 17 to capture images of the surroundings of the vehicle 2. After the process in step S1021 is completed, the control proceeds to step S1022. In step S1022, the image processing unit 26 of the vehicle 2 (driving assistance apparatus 7) combines the images captured with the front camera 15, the rear camera 16, and the pair of right and left side cameras 17 with one another to produce an around-vehicle bird's eye image Pn and stores the around-vehicle bird's eye image Pn in the storage device 25. A bird's eye image producing method is a known method and will therefore not be described in detail. The storage device 25 of the vehicle 2 further stores an around-vehicle bird's eye image Pp produced by the image processing unit 26 when the vehicle 2 has entered the garage. The image processing unit 26 reads the around-vehicle bird's eye image Pp produced when the vehicle 2 enters the garage 4 and the current around-vehicle bird's eye image Pn from the storage device 25, detects a difference between the around-vehicle bird's eye images Pn and Pp, and produces a difference image Pd according to the difference. After the process in step S1022 is completed, the control proceeds to the process in step S1023.

In step S1023, the image processing unit 26 uses a known image processing approach, such as extraction of edges in the difference image Pd and mechanical learning of the difference image Pd, is used to detect a person, an animal, an obstacle, and other objects contained in the difference image Pd and produces information Is on a result of the detection of a person and an obstacle in the difference image Pd (hereinafter referred to as "around-vehicle information"). The around-vehicle information Is produced by the image processing unit 26 is stored in the storage device 25. In the subsequent step S1024, the automatic garage entry/leaving control unit 8 reads and acquires the around-vehicle information Is from the storage device 25.

Next, in step S1025, the automatic garage entry/leaving control unit 8 of the vehicle 2 (driving assistance apparatus 7) acquires data detected with the sensor 46 from the shutter control unit 5 and sets the data as information Ib on the safety check in the space under the vehicle 2 (hereinafter referred to as "under-vehicle information"). The transmission and reception of data between the shutter control unit 5 and the vehicle 2 are performed over the network 6. The under-vehicle information Ib (data detected with sensor 46) transmitted via the communication unit 52 of the shutter control unit 5 is received by the communication unit 23 of the vehicle 2 and stored in the storage device 25. The automatic garage entry/leaving control unit 8 reads and acquires the under-vehicle information Ib from the storage device 25. After the process in step S1025 is completed, the subroutine is completed.

As described above, in step S102 in FIG. 7, the automatic garage entry/leaving control unit 8 of the vehicle 2 acquires the around-vehicle information Is and the under-vehicle information Ib. After the process in step S102 is completed, the control proceeds to step S103.

In step S103, the automatic garage entry/leaving control unit 8 evaluates whether or not the space around the vehicle 2 (around and under vehicle) is safe on the basis of the around-vehicle information Is and the under-vehicle information Ib, that is, whether or not a person, an obstacle, or any other object is present around the vehicle 2. When a result of the evaluation in step S103 indicates that the space around the vehicle 2 is safe (Yes in step S103), the control proceeds to step S104. On the other hand, when a result of the evaluation indicates that the space around the vehicle 2 is unsafe (abnormality is present) (No in step S103), the control proceeds to step S107.

In step S104, the automatic garage entry/leaving control unit 8 of the vehicle 2 transmits an open request signal requesting to open the shutter 43 to the shutter control unit 5. The open request signal is an instruction signal requesting that the shutter 43 be opened. After the process in step S104 is completed, the control proceeds to step S105.

Figure 9:
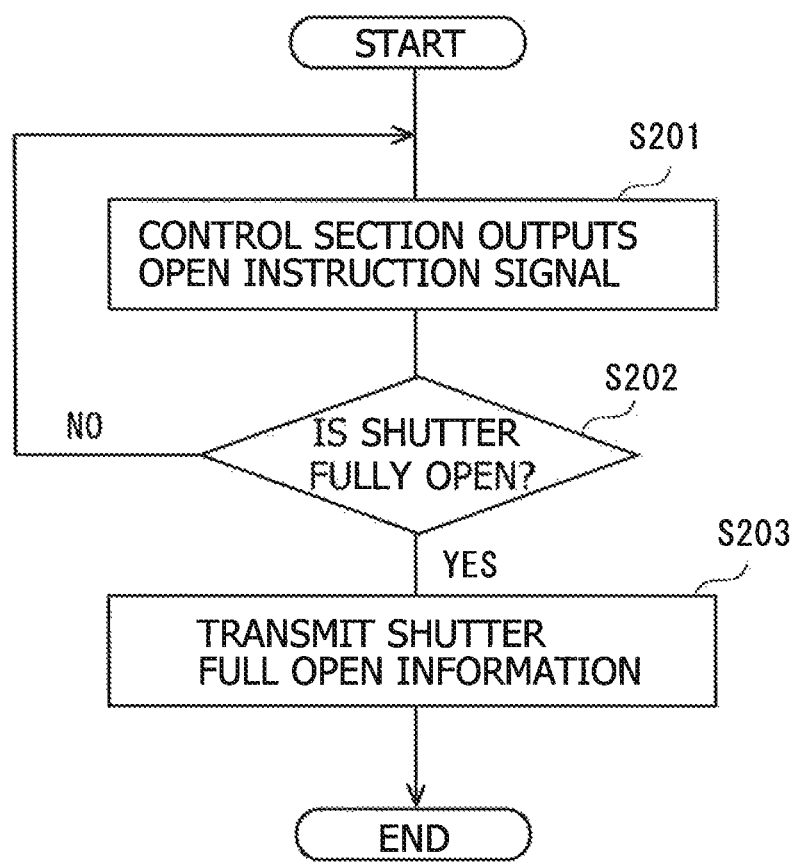
FIG. 9 is a flowchart illustrating processes in the automatic garage leaving cooperation control performed by a shutter control unit.

FIG. 9 is a flowchart illustrating processes of the automatic garage leaving cooperation control performed by the shutter control unit 5. The shutter control unit 5 initiates the processes in the present control routine in response to an event in which the shutter control unit 5 receives the open request signal requesting to open the shutter 43 from the vehicle 2. In step S201 in FIG. 9, the control unit 50 of the shutter control unit 5 outputs an open instruction signal instructing the shutter driver 45 to open the shutter 43 to the shutter driver 45. The shutter driver 45 thus opens the shutter 43.

In the subsequent step S202, the control unit 50 of the shutter control unit 5 evaluates whether or not the shutter 43 has been fully opened. The wound length of the shutter 43 can be detected on the basis of a result of detection performed by a wound length detection sensor that is not illustrated. The detection of the wound length of the shutter 43 allows evaluation of whether or not the shutter 43 has been fully opened.

When a result of the evaluation in step S202 indicates that the shutter 43 is not fully open (No in step S202), the control unit 50 returns to step S201 after a fixed period elapses. On the other hand, when a result of the evaluation in step S202 indicates that the shutter 43 is fully open (Yes in step S202), the control unit 50 proceeds to step S203. In the step S203, the control unit 50 transmits shutter full open information to the vehicle 2. The shutter full open information is information representing that the shutter 43 is fully open. After the process in step S203 is completed, the present control routine is completed.

Returning to the flowchart in FIG. 7, in step S105, the automatic garage entry/leaving control unit 8 evaluates whether or not it has received the shutter full open information from the shutter control unit 5. The shutter full open information transmitted from the control unit 50 of the shutter control unit 5 to the vehicle 2 in step S203 in FIG. 9 described above is stored in the storage device 25.

In step S105, the automatic garage entry/leaving control unit 8 accesses the storage device 25 and evaluates whether or not the shutter full open information has been received from the shutter control unit 5. When a result of the evaluation indicates that the shutter full open information has not been received (No in step S105), the control returns to step S105 after a fixed period elapses. On the other hand, when a result of the evaluation indicates that the shutter full open information has been received (Yes in step S105), the automatic garage entry/leaving control unit 8 senses that the shutter 43 is fully open. In this case, the automatic garage entry/leaving control unit 8 proceeds to step S106.

In the procedure of the processes described above, the shutter control unit 5 evaluates whether or not the shutter 43 is fully open, but the evaluation may instead be performed by the automatic garage entry/leaving control unit 8 of the vehicle 2. For example, the shutter control unit 5 regularly transmits the wound length of the shutter 43 detected with the sensor to the vehicle 2. In this case, when the wound length of the shutter 43 reaches a value corresponding to the fully open position, the automatic garage entry/leaving control unit 8 of the vehicle 2 can sense that the shutter 43 is fully open.

Figure 10:
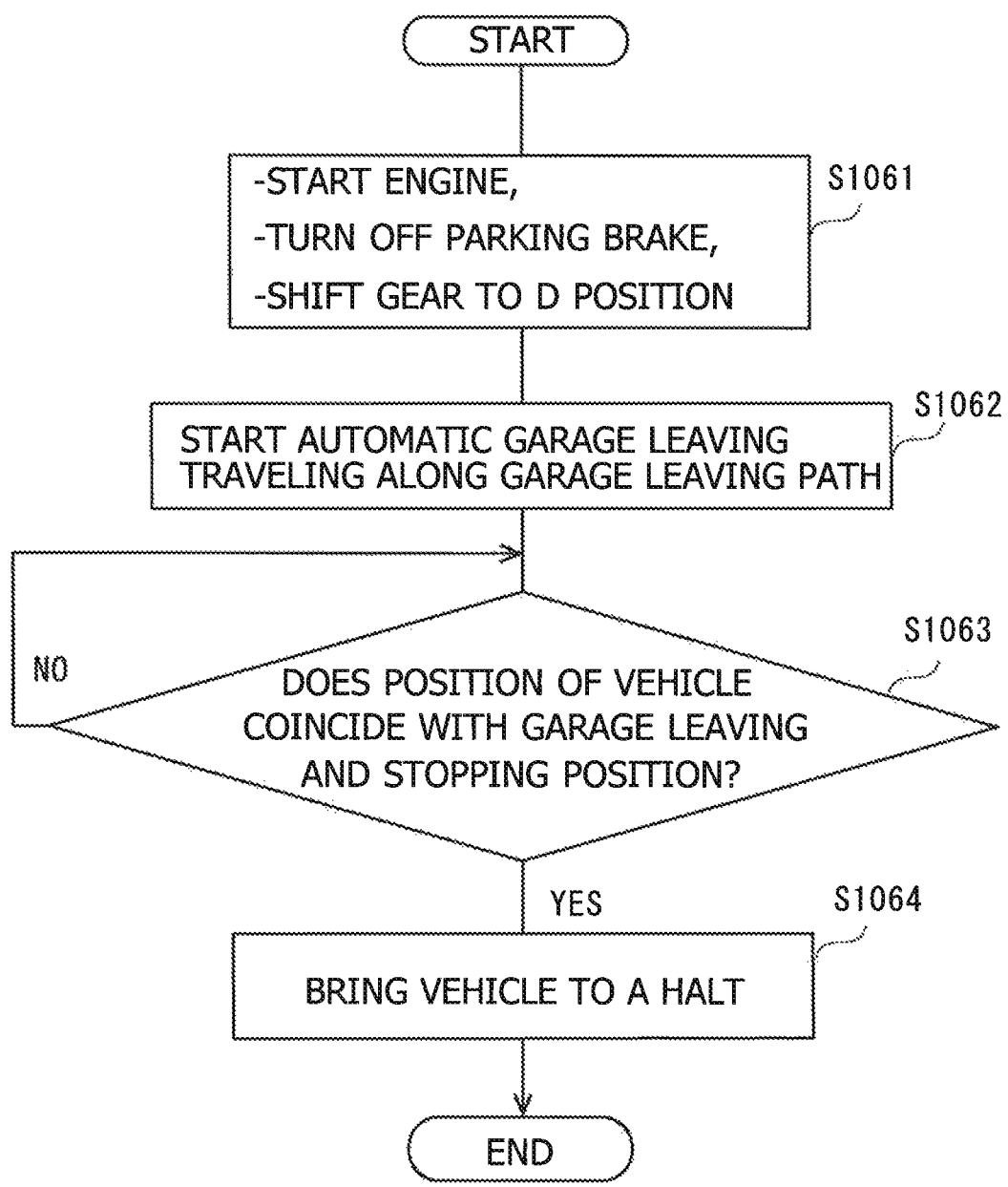
FIG. 10 is a flowchart illustrating processes in a subroutine executed in step S106 in FIG. 7.

In step S106, the automatic garage entry/leaving control unit 8 performs automatic garage leaving traveling of the vehicle 2 in which the vehicle 2 travels along the garage leaving path Lout (see FIG. 4) set in advance. FIG. 10 is a flowchart illustrating processes in a subroutine executed in step S106 in FIG. 7. In step S1061, the automatic garage entry/leaving control unit 8 of the vehicle 2 (driving assistance apparatus 7) causes the engine start device 21 to start the engine 10 and causes the parking brake control device 14 to turn off the electric parking brake. Further, in the present step, the automatic garage entry/leaving control unit 8 causes the gear shift device 13 to shift the gear position of the vehicle 2 to the D (drive) position. As a result, the vehicle 2 is ready to travel. In the subsequent step S1062, the automatic garage entry/leaving control unit 8 drives and controls the steering actuator 12 and the accelerator opening control device 11 in such a way that the vehicle 2 automatically travels along the set garage leaving path Lout.

Since the description is made with reference to the case where the vehicle 2 having entered the garage 4 with the rear side of the vehicle 2 facing the interior of the garage 4 is automatically caused to leave the garage 4, the gear position of the vehicle 2 is shifted to the D position in step S1061. However, in a case where the vehicle 2 having entered the garage 4 with the front side of the vehicle 2 facing the interior of the garage 4 is automatically caused to leave the garage 4, the gear position of the vehicle 2 may be shifted to the R (reverse) position in step S1061. Instead, in step S1061, the automatic garage entry/leaving control unit 8 may detect the orientation of the vehicle 2 with a terrestrial magnetism sensor or any other sensor and determine which of the front and rear side of the vehicle 2 faces the shutter 43 (entrance 41) on the basis of a result of the detection. In the case where the front side of the vehicle 2 faces the shutter 43, the gear position of the vehicle 2 may be shifted to the D position, whereas when the vehicle 2 is oriented in the opposite direction, the gear position may be shifted to the R position.

After the process in step S1062 is completed, the control proceeds to step S1063. In step S1063, the automatic garage entry/leaving control unit 8 evaluates whether the position of the vehicle coincides with the garage leaving and stopping position, which is the end position (target position) of the garage leaving path Lout. The position of the vehicle can be detected on the basis of the GPS signals, and the automatic garage entry/leaving control unit 8 can evaluate whether the position of the vehicle coincides with the garage leaving and stopping position on the basis of the detected position of the vehicle and the map data. When a result of the evaluation indicates that the position of the vehicle does not coincide with the garage leaving and stopping position (No in step S1063), the control returns to step S1063 again after a fixed period elapses. When a result of the evaluation indicates that the position of the vehicle coincides with the garage leaving and stopping position (Yes in step S1063), the automatic garage entry/leaving control unit 8 determines that the automatic garage leaving traveling may be terminated, and the control proceeds to step S1064.

In step S1064, the automatic garage entry/leaving control unit 8 controls the accelerator opening control device 11 to bring the vehicle 2 to a halt. The automatic garage entry/leaving control unit 8 then causes the gear shift device 13 to shift the gear position to the P (parking) position and causes the parking brake control device 14 to activate the electric parking brake. After the process in the present step is completed, the present subroutine is completed. In step S106 in FIG. 7, in which the vehicle 2 is caused to automatically travel along the garage leaving path Lout to the garage leaving and stopping position, the automatic garage leaving operation of the vehicle is completed. After the process in step S106 is completed, the present main routine is completed.

When a result of the evaluation in step S103 in FIG. 7 indicates that the space around the vehicle 2 is unsafe (abnormality is present) (No in step S103), the control proceeds to step S107. In step S107, the automatic garage entry/leaving control unit 8 transmits abnormality detection information to the mobile terminal 3 to notify the owner of the vehicle 2 that abnormality is present around the vehicle 2. The abnormality detection information is information representing that abnormality is present around the vehicle 2. After the process in step S107 is completed, the present main routine is completed. Having received the abnormality detection information from the vehicle 2, the mobile terminal 3 stores the abnormality detection information in the storage unit 35 and causes the display 33 to display the abnormality detection information. The owner of the vehicle 2 is thus allowed to be notified that abnormality is present around the vehicle 2, and the owner can then enter the garage 4 and actually check safety in the garage 4. Having transmitted the abnormality detection information to the mobile terminal 3 in step S107, the automatic garage entry/leaving control unit 8 suspends (terminates) the automatic garage leaving cooperation control without causing the vehicle 2 to leave the garage 4. The reason for this is that it has been determined that abnormality is present around the vehicle 2 and the vehicle 2 should therefore not be allowed to automatically leave the garage 4.

According to the garage cooperation control system 1 according to the present embodiment described above, when the unmanned vehicle 2 is caused to leave the garage 4 in the automatic garage leaving control, safety around the vehicle 2 in the garage 4 is confirmed and the shutter 43 is then opened, followed by initiation of the automatic garage leaving traveling of the vehicle 2. Since the safety around the vehicle 2 can be checked in the control performed by the automatic garage entry/leaving control unit 8, and the driver does not need to approach the vehicle 2 for checking the safety, the vehicle 2 is allowed to leave the garage with no human intervention through remote operation from a position far away from the garage 4.

According to the garage cooperation control system 1 according to the present embodiment, the vehicle 2 with the driver in it is, of course, allowed to leave the garage 4, in addition to the case where the unmanned vehicle 2 is caused to leave the garage 4. In this case, during the control procedures indicated in FIGS. 7 to 10, it is expected that the driver has too much time to spend. To avoid the situation, having accepted the automatic garage leaving request signal, the automatic garage entry/leaving control unit 8 of the vehicle 2 evaluates whether or not the driver has been seated on the driver's seat of the vehicle 2 on the basis of a detection signal from the seating sensor 27. The automatic garage entry/leaving control unit 8 of the vehicle 2, when it senses that the driver has been seated on the driver's seat of the vehicle 2, may notify the driver of status information during the automatic garage leaving control. The status information used herein may contain information representing a result of the safety checking performed in the space around the vehicle 2 in the garage 4 in the automatic garage leaving control and information representing the type of cooperation control the vehicle 2 and the garage 4 are currently performing. Further, the driver may be notified of the status information in the form of status information displayed on the display device 24 of the vehicle 2 or in the form of status information displayed on the display 33 of the mobile terminal 3.

Further, according to the garage cooperation control system 1 according to the present embodiment, since the engine 10 of the vehicle 2 is started after safety around the vehicle 2 is confirmed in the automatic garage leaving cooperation control, a situation in which the vehicle 2 having entered the garage 4 discharges exhaust gas in a state in which a person is present in the garage 4 can be avoided. After the vehicle 2 accepts the automatic garage leaving request signal, but before safety around the vehicle 2 is confirmed, the state of the power source of the vehicle 2 is preferably a state in which the accessory (ACC) is ON or a state in which an ignition (IG) power source is ON. It is noted that the vehicle 2 may be a hybrid vehicle or an electric vehicle. When the vehicle 2 is a hybrid vehicle, after the vehicle 2 accepts the automatic garage leaving request signal, but before safety around the vehicle 2 is confirmed, a ready-on state in which the engine is not started is preferably maintained.

<Variations>

In the garage cooperation control system 1 according to the present embodiment, a variety of variations of the automatic garage leaving control described above may be adopted. For example, in the automatic garage leaving control described above, safety around the vehicle 2 is checked both in the space around the entire circumference of the vehicle 2 (spaces in front of, behind, on the right of, and on the left of vehicle 2) and the space under the vehicle 2. Instead, a system in which when safety only in one of the spaces is checked, the shutter 43 is opened and the automatic garage leaving traveling is performed may be adopted.

Further, the above automatic garage leaving control has been described with reference to the case where in step S101 in FIG. 7, after the vehicle 2 accepts the automatic garage leaving request signal, the front camera 15, the rear camera 16, and the side cameras 17, which are incorporated in the vehicle, and the sensor 46, which is installed in the garage 4, are used to check safety around the vehicle 2. Instead, after the vehicle 2 is caused to enter the garage 4, the cameras and the sensor described above may be used to check whether abnormality is present in the garage 4 whenever a fixed period elapses before the vehicle 2 accepts the automatic garage leaving request signal.

Further, in the automatic garage leaving control described above, after the state in which the shutter 43 is fully open is sensed, the vehicle 2 is allowed to start traveling out of the garage 4. Instead, the vehicle 2 may be allowed to start traveling at the point of time when a state in which an opening height Ho of the shutter 43 becomes greater than the height Hc of the vehicle 2. The opening height Ho of the shutter 43 can be determined on the basis of the wound length of the shutter 43, and the wound length of the shutter 43 can be detected with the wound length detection sensor (not illustrated). The height Hc of the vehicle 2 may be accepted in advance in the form of the user's setting input. The user (owner of vehicle 2, for example) refers to a brochure or any other document, inputs the height Hc of the vehicle 2 via an input device (not illustrated), and registers the setting value. For example, a touch panel display device may be used as the display device 24 of the vehicle 2, and the touch panel may be so operated that the height Hc of the vehicle 2 is set.

Still instead, the opening height Ho of the shutter 43 that is open may be estimated on the basis of an image captured with the in-vehicle camera 18 provided in the vehicle 2, and when it is determined that the estimated height is greater than the height Hc of the vehicle 2, the vehicle 2 may be allowed to start traveling in response to the determination. According to the present variation, the vehicle 2 is allowed to start traveling to leave the garage at the point of time when the state in which the opening height Ho is greater than the height Hc of the vehicle 2 is sensed without waiting for the fully open state of the shutter 43, whereby the vehicle 2 is allowed to leave the garage safely and quickly.

Second Embodiment

[Sensing of Abnormality of Shutter]

In a garage cooperation control system 1 according to a second embodiment, before the shutter 43 is opened, additional control in which it is evaluated whether or not the shutter 43 malfunctions is performed in the automatic garage leaving control. Specifically, in the automatic garage leaving control, after the shutter control unit 5 issues an instruction to start opening the shutter 43 to the shutter driver 45, the shutter control unit 5 monitors a pulse signal issued on a fixed cycle basis as long as the shutter driver 45 normally functions (hereinafter also referred to as "watchdog signal"). After a fixed period elapses since the shutter control unit 5 outputted the open instruction signal to the shutter driver 45, the shutter control unit 5 evaluates whether or not the pulse signal from the shutter driver 45 has been received on a regular basis and determines whether the shutter 43 (shutter driver 45) is normally operating.

When a result of the evaluation indicates that the watchdog signal from the shutter driver 45 has not been received on the regular basis and the shutter driver 45 has therefore not been normally operating, the control unit 50 of the shutter control unit 5 transmits shutter abnormal shutdown information to the automatic garage entry/leaving control unit 8 of the vehicle 2. The shutter abnormal shutdown information is information representing that the shutter 43 has been abnormally shut down.

Having received the shutter abnormal shutdown information from the shutter control unit 5 as described above, the vehicle 2 stores the shutter abnormal shutdown information in the storage device 25. The automatic garage entry/leaving control unit 8 of the vehicle 2 can then read the shutter abnormal shutdown information from the storage device 25 to sense that the shutter 43 has been abnormally shut down. The automatic garage entry/leaving control unit 8 of the vehicle 2, when it senses that the shutter 43 has been abnormally shut down in the automatic garage leaving control as described above, suspends the automatic garage leaving control and transmits the shutter abnormal shutdown information to the mobile terminal 3 of the owner of the vehicle 2. In this case, the reason why the vehicle 2 is not allowed to leave the garage 4 but the automatic garage leaving cooperation control is suspended is that the shutter 43 has possibly failed or power outage has occurred and suspension of the automatic garage leaving cooperation control can preferably prevent the vehicle 2 to be caused to automatically leave the garage 4 from hitting the shutter 43.

On the other hand, having received the shutter abnormal shutdown information from the vehicle 2, the mobile terminal 3 stores the shutter abnormal shutdown information in the storage unit 35 and notifies the owner of the vehicle 2 of the abnormality of the shutter 43 (shutter failure or power outage, for example) by displaying the shutter abnormal shutdown information on the display 33. As a result, the owner of the vehicle 2 can quickly grasp the situation in which the shutter 43 has failed or power outage has occurred. The mobile terminal 3 having received the shutter abnormal shutdown information may notify the owner of the vehicle 2 of the abnormality of the shutter 43 by outputting the shutter abnormal shutdown information in the form of voice from the loudspeaker 34.

<Variations>

In the second embodiment, abnormality of the shutter is sensed on the basis of whether or not the shutter control unit 5 has successfully received the watchdog signal from the shutter driver 45 on a fixed cycle basis, and other variations can instead be adopted. For example, the shutter control unit 5 may transmit the shutter abnormal shutdown information to the vehicle 2 in response to reception of a failure signal from the shutter driver 45.

Still instead, the cameras provided in the vehicle 2 or the surrounding object sensors 19 may be used to monitor the action of the shutter 43, and it may be evaluated whether the shutter driver 45 is normally operating on the basis of a result of the monitoring. For example, in a case where any of the cameras senses that the shutter 43 is not operating although the shutter control unit 5 has outputted the open instruction signal to the shutter driver 45, the shutter control unit 5 may transmit the shutter abnormal shutdown information to the automatic garage entry/leaving control unit 8 of the vehicle 2.

More specifically, in the case where the vehicle 2 has entered the garage 4 with the rear side of the vehicle 2 facing the interior of the garage 4, the front camera 15, the in-vehicle camera 18, and the surrounding object sensors 19 located on the front side of the vehicle 2 may be used to monitor the action of the shutter 43 because the front side of the vehicle 2 faces the shutter 43. On the other hand, in the case where the rear side of the vehicle 2 faces the shutter 43, the rear camera 16 and the surrounding object sensors 19 located on the rear side of the vehicle 2 may be used to monitor the action of the shutter 43. Further, the terrestrial magnetism sensor or any other sensor can be used to detect the orientation of the vehicle 2, and it can be evaluated which of the front side and the rear side of the vehicle 2 faces the shutter 43 (entrance 41) on the basis of a result of the detection. Moreover, in a case where the vehicle 2 is provided with a millimeter-wave radar or any other component, the action of the shutter 43 may be monitored on the basis of a result of the detection performed by the millimeter-wave radar.

Third Embodiment

[Shutter Closing Timing]

A garage cooperation control system 1 according to a third embodiment is characterized in that in the automatic garage leaving control, when the automatic garage entry/leaving control unit 8 of the driving assistance apparatus 7 senses that the entire automatically traveling vehicle 2 has gone out of the garage 4, the automatic garage entry/leaving control unit 8 transmits a close request signal requesting to close the shutter 43 to the shutter control unit 5.

In the present embodiment, after the automatic garage leaving traveling of the vehicle 2 is initiated in step S106 in FIG. 7, the automatic garage entry/leaving control unit 8 causes the rear camera 16 to capture images of the garage 4 behind the vehicle 2 during the automatic garage leaving traveling. Behind-vehicle images Pb captured with the rear camera 16 during the automatic garage leaving traveling are successively stored in the storage device 25 of the vehicle 2. Further, a garage leaving line Lw is drawn on a road surface outside the entrance 41 of the garage 4 along the width direction of the entrance 41, as illustrated in FIG. 4. The garage leaving line Lw is drawn, for example, in the form of a white line but may be drawn in the form of another color line.

Figure 11:
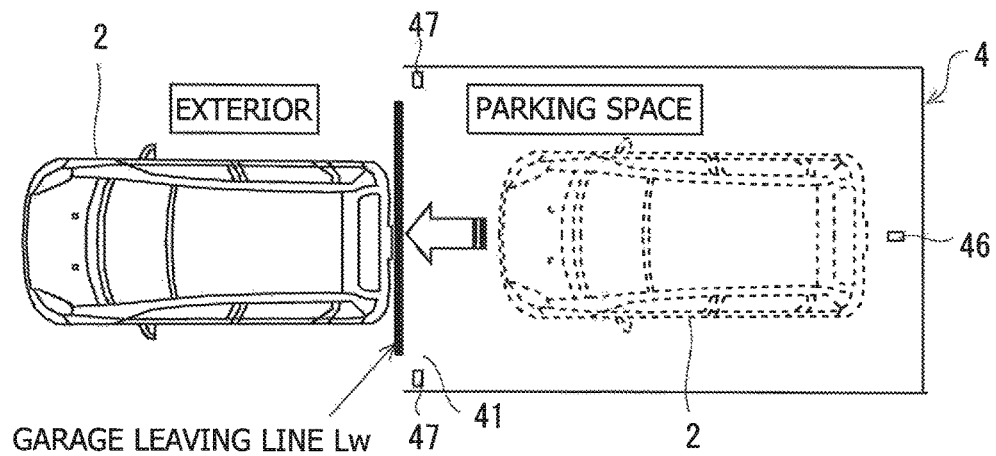
FIG. 11 illustrates a state in which the vehicle automatically leaves the garage and the rearmost end of the automatically traveling vehicle just passes a garage leaving line.

In the present embodiment, the state in which the entire vehicle 2 has gone out of the garage 4 is sensed by checking that the rearmost end of the vehicle 2 has passed the garage leaving line Lw on the basis of the behind-vehicle images Pb captured during the automatic garage leaving traveling. FIG. 11 illustrates a state in which the vehicle 2 automatically leaves the garage 4 and the rearmost end of the automatically traveling vehicle 2 just passes the garage leaving line Lw.

In the automatic garage leaving control, the automatic garage entry/leaving control unit 8 of the vehicle 2 reads the behind-vehicle images Pb from the storage device 25 on a fixed period basis and evaluates whether or not the rearmost end of the automatically traveling vehicle 2 has crossed over the garage leaving line Lw. When a result of the evaluation indicates that the rearmost end of the automatically traveling vehicle 2 has crossed over the garage leaving line Lw, the automatic garage entry/leaving control unit 8 determines that the entire vehicle 2 has gone out of the garage 4, as also illustrated in FIG. 11. In the present embodiment, at the point of time when the state in which the entire vehicle 2 has gone out of the garage 4 is sensed, the automatic garage entry/leaving control unit 8 of the vehicle 2 transmits the close request signal requesting to close the shutter 43 to the shutter control unit 5. Having received the close request signal requesting to close the shutter 43, the control unit 50 outputs a close instruction signal instructing to close the shutter 43 to the shutter driver 45 to perform control in which the shutter driver 45 closes the shutter 43. As a result, the timing at which the shutter 43 is closed can be more safely determined.

<Variations>

In the third embodiment, other methods for sensing that the entire vehicle 2 during the automatic garage leaving traveling has gone out of the garage 4 may be adopted. For example, the distance over which the vehicle 2 has traveled since the vehicle 2 started the automatic garage leaving traveling may be detected. At the point of time when the vehicle 2 has traveled over a preset distance, it may be assumed that the entire vehicle 2 has gone out of the garage 4. The distance over which the vehicle 2 during the automatic garage leaving traveling has traveled can be calculated, for example, on the basis of the GPS signals. Instead, the state in which the entire vehicle 2 during the automatic garage leaving traveling has gone out of the garage 4 may be sensed on the basis of a result of detection performed by the pair of distance measurement sensors 47 provided at the entrance 41 of the garage 4, as illustrated in FIG. 11.

In the automatic garage leaving control according to the third embodiment, after the automatic garage entry/leaving control unit 8 of the vehicle 2 transmits the close request signal requesting to close the shutter 43 to the shutter control unit 5, and when the automatic garage entry/leaving control unit 8 senses that the shutter 43 has been fully closed, shutter full close information representing that the shutter 43 has been fully closed may be stored in the storage device 25, and after the vehicle 2 is caused to automatically travel to the garage leaving and stopping position along the garage leaving path Lout, the driver may be notified of the shutter full close information when the driver is seated on the driver' seat.

The state in which the shutter 43 is fully closed can be sensed on the basis of the wound length of the shutter 43. When the wound length of the shutter 43 reaches a value corresponding to the fully open position, the shutter control unit 5 may transmit the shutter full close information to the vehicle 2. The vehicle 2 having received the shutter full close information stores the shutter full close information in the storage device 25. The state in which the driver is seated on the driver's seat of the vehicle 2 having been brought to a halt at the end point of the garage leaving path Lout can be detected by the seating sensor 27.

When the state in which the driver is seated on the driver's seat of the vehicle 2 is sensed, the automatic garage entry/leaving control unit 8 of the vehicle 2 notifies the driver that the shutter 43 is fully closed. For example, the automatic garage entry/leaving control unit 8 causes the display 33 to display the shutter full close information or causes the voice speaker 34 to output voice. Further, the automatic garage entry/leaving control unit 8 may notify the driver that the shutter 43 is fully closed by transmitting the shutter full close information to the mobile terminal 3 to cause the display 33 or the loudspeaker 34 to output the shutter full close information. As a result, the driver can drive the vehicle 2 and move away from the garage 4 at ease.

Fourth Embodiment

[Sensing of Entry at the Time of Garage Leaving]

In a garage cooperation control system 1 according to a fourth embodiment, in the automatic garage leaving control, the automatic garage entry/leaving control unit 8 requests the shutter control unit 5 to transmit the open request signal requesting to open the shutter 43 and then evaluates whether or not a suspicious person, a child, or any other moving body has entered the garage 4 from the outside. Specifically, the automatic garage entry/leaving control unit 8 of the vehicle 2 senses a suspicious person, a child, or any other moving body on the basis of a result of sensing performed by the distance measurement sensors 47 illustrated in FIG. 2B, FIG. 11, and other figures.

In the present embodiment, when entry of a suspicious person, a child, or any other moving body into the garage 4 is sensed during the automatic garage leaving control, the automatic garage leaving cooperation control is suspended. For example, at the point of time when entry of a moving body into the garage 4 is sensed, the open/close control of the shutter 43 is terminated, and the mobile terminal 3 of the owner of the vehicle 2 is notified of moving body entry information. The moving body entry information is information representing that a suspicious person, a child, or any other object has entered the garage 4 during the automatic garage leaving control. The automatic garage entry/leaving control unit 8 of the vehicle 2 transmits the moving body entry information to the mobile terminal 3. Having received the moving body entry information from the vehicle 2, the mobile terminal 3 can notify the owner of the vehicle 2 that somebody may have entered the garage 4 from the outside by causing the display 33 to display the moving body entry information or causing the loudspeaker 34 to output voice.

Fifth Embodiment

Figure 12:
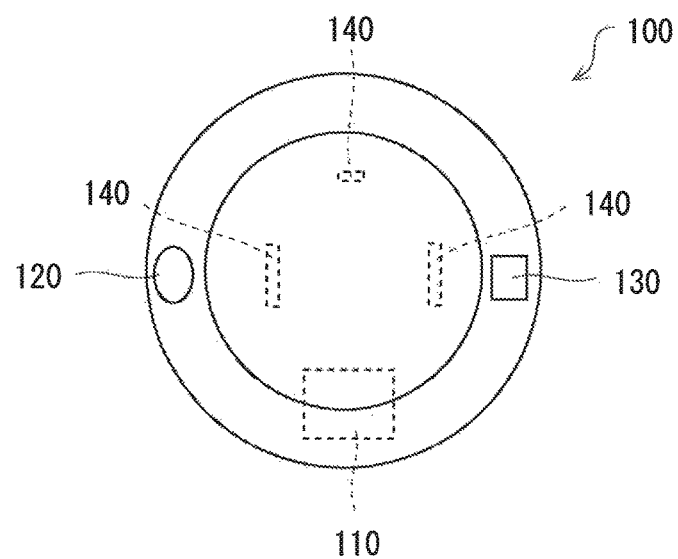
FIG. 12 illustrates a monitoring robot according to a fifth embodiment.

A garage cooperation control system 1 according to a fifth embodiment differs from the first embodiment in that a self-propelled monitoring robot 100, which travels (in a self-propelled manner) along the floor of the garage 4, replaces the sensor 46 and checks safety around the vehicle 2 and in the space under the vehicle 2. FIG. 12 illustrates the monitoring robot 100 according to the fifth embodiment. The monitoring robot 100 includes a control unit 110, a camera 120, a communication unit 130, a traveling unit 140 including driven wheels and other components. The monitoring robot 100 can freely travel in a self-propelled manner along the floor of the garage 4 by driving the traveling unit 140. The monitoring robot 100 captures images of the space under the vehicle 2 with the camera 120 while traveling in a self-propelled manner in the space under the vehicle 2 having entered the parking space.

The control unit 110 includes a CPU, a ROM that is a retention unit that retains fixed data, such as a program read by the CPU, a RAM that is an area retention unit that dynamically forms a variety of memory areas, such as a work area where data are processed in accordance with the program, and other components. The communication unit 130 is communicatively connected to the vehicle 2 over the network 6.

In the automatic garage leaving control in the present embodiment, in step S102 in FIG. 7, the automatic garage entry/leaving control unit 8 of the vehicle 2 acquires vehicle surrounding information (around-vehicle information Is and under-vehicle information Ib) on the presence or absence of abnormality around the vehicle 2 from the monitoring robot 100. The monitoring robot 100 captures images with the camera 120 while traveling in a self-propelled manner in the space around the vehicle 2 and the space under the vehicle 2. The images of the surroundings around the vehicle 2 captured with the camera 120 are transmitted from the monitoring robot 100 to the vehicle 2. The automatic garage entry/leaving control unit 8 of the vehicle 2 evaluates whether a person, an obstacle, or any other object is present along the circumference of the vehicle 2 (around and under vehicle) on the basis of the images of the surroundings around the vehicle 2 transmitted from the monitoring robot 100 to the vehicle 2 and checks safety. The other points are the same as those in the first embodiment.

The preferable embodiments of the present invention have been described above. However, the vehicle and the garage cooperation control system including the driving assistance apparatus according to the present invention are not limited to those in the embodiments described above, and possible combinations of the embodiments fall within the scope of the present invention. Further, the order of the processes carried out by the garage cooperation control system 1 described above can be swapped with each other as appropriate, and part of the processes can be omitted as appropriate.

REFERENCE SIGNS LIST

1 Garage cooperation control system
2 Vehicle
3 Mobile terminal
4 Garage
5 Shutter control unit
6 Network
7 Driving assistance apparatus
8 Automatic garage entry/leaving control unit
43 Shutter

The invention claimed is:
1. An in-vehicle driving assistance apparatus that causes a vehicle to automatically leave a garage including a shutter controller that opens and closes a shutter of the garage, the driving assistance apparatus comprising:
 a detector that detects vehicle surrounding information on presence or absence of abnormality including presence or absence of a person, an animal, or an obstacle around the vehicle when the vehicle is parked in the garage; and
 an automatic garage leaving controller that performs automatic garage leaving cooperation control in which the automatic garage leaving controller cooperates with the shutter controller to cause the vehicle to automatically leave the garage, wherein the automatic garage leaving controller acquires, from the detector, the vehicle surrounding information when the automatic garage leaving controller accepts an automatic garage leaving request signal, transmits an open request signal requesting to open the shutter to the shutter controller when the automatic garage leaving controller determines based on the vehicle surrounding information that a space around the vehicle is safe, and suspends the automatic garage leaving cooperation control when the automatic garage leaving controller determines that abnormality is present around the vehicle,
 wherein the automatic garage leaving controller suspends the automatic garage leaving cooperation control when the automatic garage leaving controller senses that a moving body has entered the garage from outside after the automatic garage leaving controller transmits the open request signal to the shutter controller.
2. The driving assistance apparatus according to claim 1, wherein the automatic garage leaving controller notifies a mobile terminal of a user of abnormality detection information when the automatic garage leaving controller determines that abnormality is present around the vehicle.

3. The driving assistance apparatus according to claim 1, wherein the automatic garage leaving controller transmits a close request signal requesting to close the shutter to the shutter controller when the automatic garage leaving controller senses that the automatically traveling vehicle has gone out of the garage.

4. The driving assistance apparatus according to claim 1, wherein the automatic garage leaving controller suspends the automatic garage leaving cooperation control when the automatic garage leaving controller senses that the shutter has been abnormally shut down after the automatic garage leaving controller transmits the open request signal to the shutter controller.

5. The driving assistance apparatus according to claim 1, wherein the automatic garage leaving controller notifies a driver of status information during the automatic garage leaving control when the automatic garage leaving controller receives the automatic garage leaving request signal and senses that the driver is in the vehicle.

6. An in-vehicle driving assistance apparatus that causes a vehicle to automatically leave a garage including a shutter controller that opens and closes a shutter of the garage, the driving assistance apparatus comprising: a detector that detects vehicle surrounding information on presence or absence of abnormality including presence or absence of a person, an animal, or an obstacle around the vehicle when the vehicle is parked in the garage; and an automatic garage leaving controller that performs automatic garage leaving cooperation control in which the automatic garage leaving controller cooperates with the shutter controller to cause the vehicle to automatically leave the garage, wherein the automatic garage leaving controller acquires, from the detector, the vehicle surrounding information when the automatic garage leaving controller accepts an automatic garage leaving request signal, transmits an open request signal requesting to open the shutter to the shutter controller when the automatic garage leaving controller determines based on the vehicle surrounding information that a space around the vehicle is safe, and suspends the automatic garage leaving cooperation control when the automatic garage leaving controller determines that abnormality is present around the vehicle, wherein the automatic garage leaving controller notifies a mobile terminal of a user of moving body entry information when the automatic garage leaving controller senses that a moving body has entered the garage from outside after the automatic garage leaving controller transmits the open request signal to the shutter controller.

7. An in-vehicle driving assistance apparatus that causes a vehicle to automatically leave a garage including a shutter controller that opens and closes a shutter of the garage, the driving assistance apparatus comprising:
a detector that detects vehicle surrounding information on presence or absence of abnormality including presence or absence of a person, an animal, or an obstacle around the vehicle when the vehicle is parked in the garage; and
an automatic garage leaving controller that performs automatic garage leaving cooperation control in which the automatic garage leaving controller cooperates with the shutter controller to cause the vehicle to automatically leave the garage, wherein the automatic garage leaving controller acquires, from the detector, the vehicle surrounding information when the automatic garage leaving controller accepts an automatic garage leaving request signal, transmits an open request signal requesting to open the shutter to the shutter controller when the automatic garage leaving controller determines based on the vehicle surrounding information that a space around the vehicle is safe, and suspends the automatic garage leaving cooperation control when the automatic garage leaving controller determines that abnormality is present around the vehicle,
wherein the automatic garage leaving controller notifies a mobile terminal of a user of shutter abnormal shut down information when the automatic garage leaving controller senses that the shutter has been abnormally shut down after the automatic garage leaving controller transmits the open request signal to the shutter controller.

8. An in-vehicle driving assistance apparatus that causes a vehicle to automatically leave a garage including a shutter controller that opens and closes a shutter of the garage, the driving assistance apparatus comprising:
a detector that detects vehicle surrounding information on presence or absence of abnormality including presence or absence of a person, an animal, or an obstacle around the vehicle when the vehicle is parked in the garage; and
an automatic garage leaving controller that performs automatic garage leaving cooperation control in which the automatic garage leaving controller cooperates with the shutter controller to cause the vehicle to automatically leave the garage, wherein the automatic garage leaving controller acquires, from the detector, the vehicle surrounding information when the automatic garage leaving controller accepts an automatic garage leaving request signal, transmits an open request signal requesting to open the shutter to the shutter controller when the automatic garage leaving controller determines based on the vehicle surrounding information that a space around the vehicle is safe, and suspends the automatic garage leaving cooperation control when the automatic garage leaving controller determines that abnormality is present around the vehicle,
wherein the automatic garage leaving controller causes the vehicle to start traveling when the automatic garage leaving controller senses that an opening height of the shutter becomes greater than a height of the vehicle after the automatic garage leaving controller transmits the open request signal to the shutter controller.

* * * * *